US007080626B2

(12) United States Patent
Ament et al.

(10) Patent No.: US 7,080,626 B2
(45) Date of Patent: Jul. 25, 2006

(54) INTAKE MIXTURE MOTION AND COLD START FUEL VAPOR ENRICHMENT SYSTEM

(75) Inventors: Frank Ament, Troy, MI (US); Mary Beth Furness, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 242 days.

(21) Appl. No.: 10/850,768

(22) Filed: May 21, 2004

(65) Prior Publication Data

US 2004/0216725 A1 Nov. 4, 2004

Related U.S. Application Data

(63) Continuation-in-part of application No. 10/383,783, filed on Mar. 7, 2003, now Pat. No. 6,868,837.

(51) Int. Cl.
*F02M 21/00* (2006.01)
*G06F 19/00* (2006.01)

(52) U.S. Cl. ................. 123/399; 123/179.18; 123/520; 123/491

(58) Field of Classification Search ................ 123/399, 123/431, 304, 575, 525, 526, 527, 520, 491, 123/179.18; 701/103–105, 113
See application file for complete search history.

(56) References Cited

U.S. PATENT DOCUMENTS

| | | | | |
|---|---|---|---|---|
| 6,234,153 | B1 | 5/2001 | DeGroot et al. | |
| 6,318,345 | B1 * | 11/2001 | Weber et al. | 123/520 |
| 6,371,094 | B1 * | 4/2002 | Wagner | 123/576 |
| 6,769,418 | B1 * | 8/2004 | Reddy | 123/520 |
| 2005/0066939 | A1 * | 3/2005 | Shimada et al. | 123/431 |

* cited by examiner

*Primary Examiner*—Hai Huynh
(74) *Attorney, Agent, or Firm*—Christopher DeVries

(57) ABSTRACT

An engine system includes an engine having an intake manifold, a cylinder and an intake mixture motion system. The intake mixture motion system includes a plate disposed upstream of the cylinder and an actuator that moves the plate between an open position and a closed position to direct cylinder air flow. The plate is in the closed position for a predetermined period after engine start-up. A fuel system communicates with the engine and supplies a first quantity of liquid fuel to the engine at a first A/F ratio. The fuel system supplies a second quantity of vapor fuel to the engine at a second A/F ratio to provide a fuel mixture having a third A/F ratio during the predetermined period.

43 Claims, 7 Drawing Sheets

INTAKE MIXTURE MOTION AND COLD START FUEL VAPOR ENRICHMENT SYSTEM

CROSS-REFERENCE TO RELATED APPLICATIONS

This application is a continuation-in-part of U.S. patent application Ser. No. 10/383,783 filed on Mar. 7, 2003 now U.S. Pat. No. 6,868,837. The disclosure of the above application is incorporated herein by reference.

FIELD OF THE INVENTION

The present invention relates to engine control systems, and more particularly to engine control systems that improves hydrocarbon (HC) emissions during start-up.

BACKGROUND OF THE INVENTION

During combustion, an internal combustion engine oxidizes gasoline and combines hydrogen ($H_2$) and carbon (C) with air. Combustion creates chemical compounds such as carbon dioxide ($CO_2$), water ($H_2O$), carbon monoxide (CO), nitrogen oxides ($NO_x$), unburned hydrocarbons (HC), sulfur oxides ($SO_x$), and other compounds. During an initial startup period after a long soak, the engine is still “cold” after starting and combustion of the gasoline is incomplete. A catalytic converter treats exhaust gases from the engine. During the startup period, the catalytic converter is also “cold” and does not operate optimally.

In one conventional approach, an engine controller commands a lean air/fuel (A/F) ratio and supplies a reduced mass of liquid fuel to the engine to provide compensation. More air is available relative to the mass of liquid fuel to sufficiently oxidize the CO and HC. However, the lean condition reduces engine stability and adversely impacts vehicle drivability.

In another conventional approach, the engine controller commands a fuel-rich mixture for stable combustion and good vehicle drivability. A secondary air injection system provides an overall lean exhaust A/F ratio by injecting air into the exhaust stream during the initial start-up period. The additional injected air heats the catalytic converter due to the exothermic reaction of oxidizing the excess CO and HC. The warmed catalytic converter oxidizes CO and HC and reduces $NO_x$ to lower emissions levels.

This approach, however, includes distinct disadvantages. One disadvantage is that the secondary air injection system increases cost and complexity of the engine control system and is only used during a short initial cold start period. Another disadvantage is that the additional liquid fuel produces a fuel film that coats the engine components and contributes to uncontrolled HC emissions, oil contamination, spark ignition problems and increased fuel consumption.

SUMMARY OF THE INVENTION

Accordingly, the present invention provides an engine system including an engine having an intake manifold and a cylinder. An intake mixture motion system includes a plate disposed between the intake manifold and the cylinder or within the intake manifold and an actuator that moves the plate between an open position and a closed position to direct cylinder air flow. The plate is in the closed position for a predetermined period after engine start-up. A fuel system communicates with the engine and supplies a first quantity of liquid fuel to the engine at a first A/F ratio. The fuel system supplies a second quantity of vapor fuel to the engine at a second A/F ratio to provide a fuel mixture having a third A/F ratio during the predetermined period.

In one feature, the plate obstructs a portion of an intake passage into the cylinder when in the closed position.

In another feature, the engine system further includes a vapor port through which the second quantity of vapor fuel is supplied. The plate includes a shaped orifice that is disposed upstream of the vapor port when the plate is in the closed position. A portion of the cylinder air flow is accelerated through the shaped orifice across the vapor port.

In another feature, the fuel system adjusts the first and second quantities based on a temperature of the engine. The second quantity is zero if the engine temperature is outside of a specified temperature range. The engine temperature is an intake manifold temperature. Alternatively, the engine temperature is an intake valve temperature.

In another feature, an initial A/F ratio of liquid fuel is supplied to the engine during start-up and the third A/F ratio is estimated based thereon.

In still another feature, an available A/F ratio of vapor fuel within the fuel tank is determined and is compared with a target A/F ratio range. The second quantity is set to zero if the A/F ratio of the vapor fuel is outside of the target A/F ratio range. The available A/F ratio is adjusted based on an A/F ratio offset.

In yet another feature, the engine system further includes an exhaust A/F ratio sensor that monitors an exhaust A/F ratio. The exhaust A/F ratio is compared to a target A/F ratio range and the first and second quantities are adjusted if the exhaust A/F ratio is outside of the target A/F ratio range. An A/F ratio offset is calculated based on the exhaust A/F ratio and the target A/F ratio.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
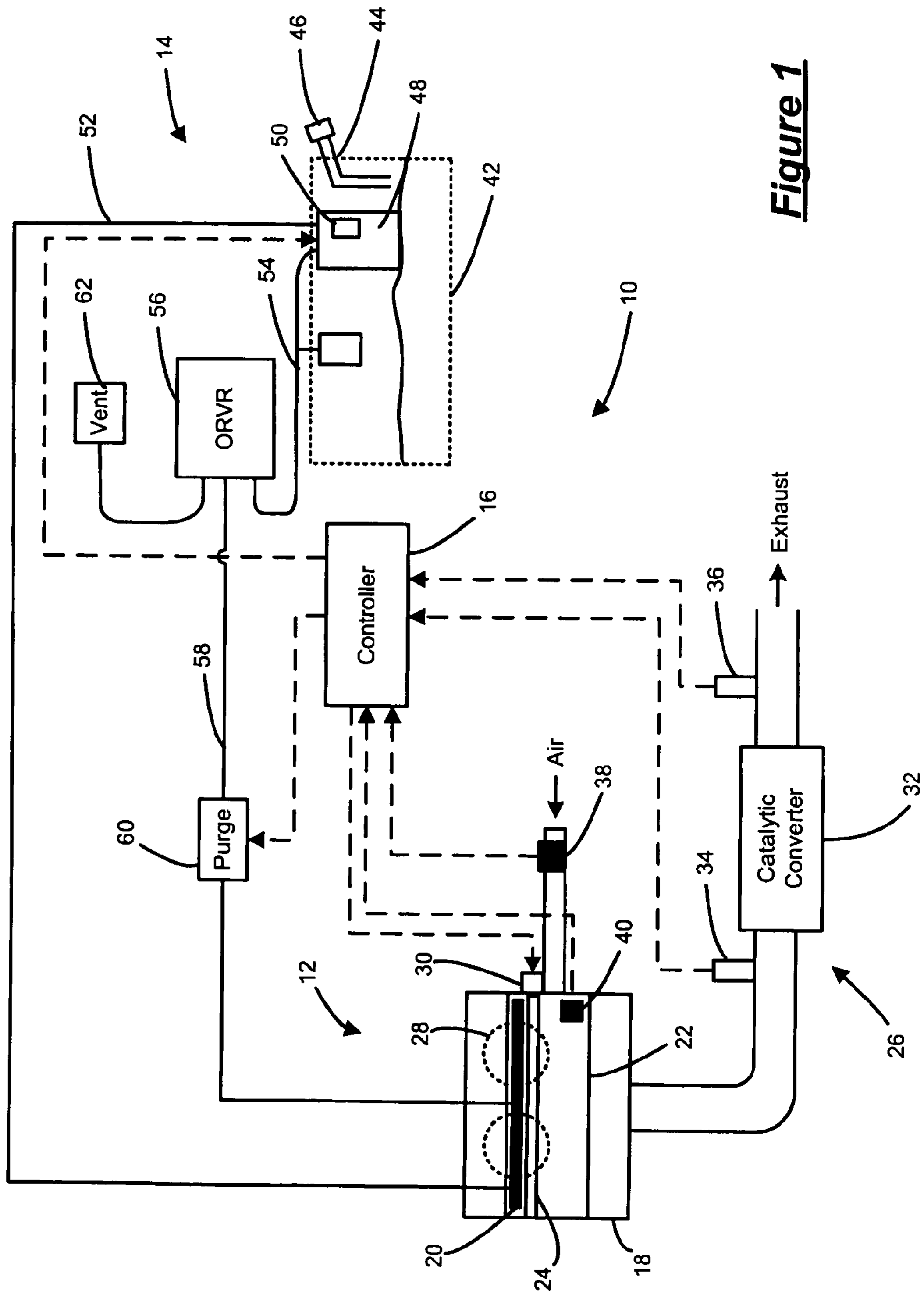
FIG. 1 is a functional block diagram of an engine control system and a fuel system according to the present invention.

The following description of the preferred embodiment is merely exemplary in nature and is in no way intended to limit the invention, its application, or uses. For purposes of clarity, the same reference numbers will be used in the drawings to identify similar elements.

Referring to FIG. 1, a vehicle 10 is schematically illustrated and includes an engine system 12 and a fuel system 14. One or more controllers 16 communicate with the engine and fuel systems 12,14. The fuel system 14 selectively supplies liquid and/or vapor fuel to the engine system 12, as will be described in further detail below.

The engine system 12 includes an engine 18, a fuel injection system 20, an intake manifold 22, an intake mixture motion (IMM) system 24 and an exhaust system 26. Air is drawn into the engine 18 through the intake manifold 22. The air is mixed with fuel and the air/fuel (A/F) mixture is combusted within cylinders 28 of the engine 18. Although two cylinders 28 are illustrated, it is appreciated that the engine 18 can include more or fewer cylinders 28 including, but not limited to 1, 3, 4, 5, 6, 8, 10 and 12 cylinders. The fuel injection system 20 includes liquid and vapor fuel injectors as described in further detail below and controls injection of liquid and/or vapor fuel into the cylinders 28. The IMM system 24 includes air flow plates and an actuator 30 to regulate air flow into the cylinders 28. The fuel injection system 20 and IMM system 24 operate according to the cold start fuel vapor enrichment control of the present invention.

Exhaust flows through the exhaust system 26 and is treated in a catalytic converter 32. First and second exhaust $O_2$ sensors 34 and 36 (e.g., wide-range A/F ratio sensors) communicate with the controller 16 and provide exhaust A/F ratio signals to the controller 16. A mass air flow (MAF) sensor 38 is located within an air inlet and provides a MAF signal based on the mass of air flowing into the intake manifold 22. The controller 16 uses the MAF signal to determine the A/F ratio supplied to the engine 18. An intake manifold temperature sensor 40 generates an intake air temperature signal that is sent to the controller 16.

The fuel system 14 includes a fuel tank 42 that contains liquid fuel and fuel vapor. A fuel inlet 44 extends from the fuel tank 42 to enable fuel filling. A fuel cap 46 closes the fuel inlet 44 and may include a bleed hole (not shown). A modular reservoir assembly (MRA) 48 is disposed within the fuel tank 42 and includes a fuel pump 50. The MRA 48 includes a liquid fuel line 52 and a vapor fuel line 54.

The fuel pump 50 pumps liquid fuel through the liquid fuel line 52 to the fuel injection system 20 of the engine 18. Vapor fuel flows through the vapor fuel line 54 into an on-board refueling vapor recovery (ORVR) canister 56. A vapor fuel line 58 connects a purge solenoid valve 60 to the ORVR canister 56. The controller 16 modulates the purge solenoid valve 60 to selectively enable vapor fuel flow to the fuel injection system 20 of the engine 18. The controller 16 modulates a canister vent solenoid valve 62 to selectively enable air flow from atmosphere into the ORVR canister 56.

Figure 2:
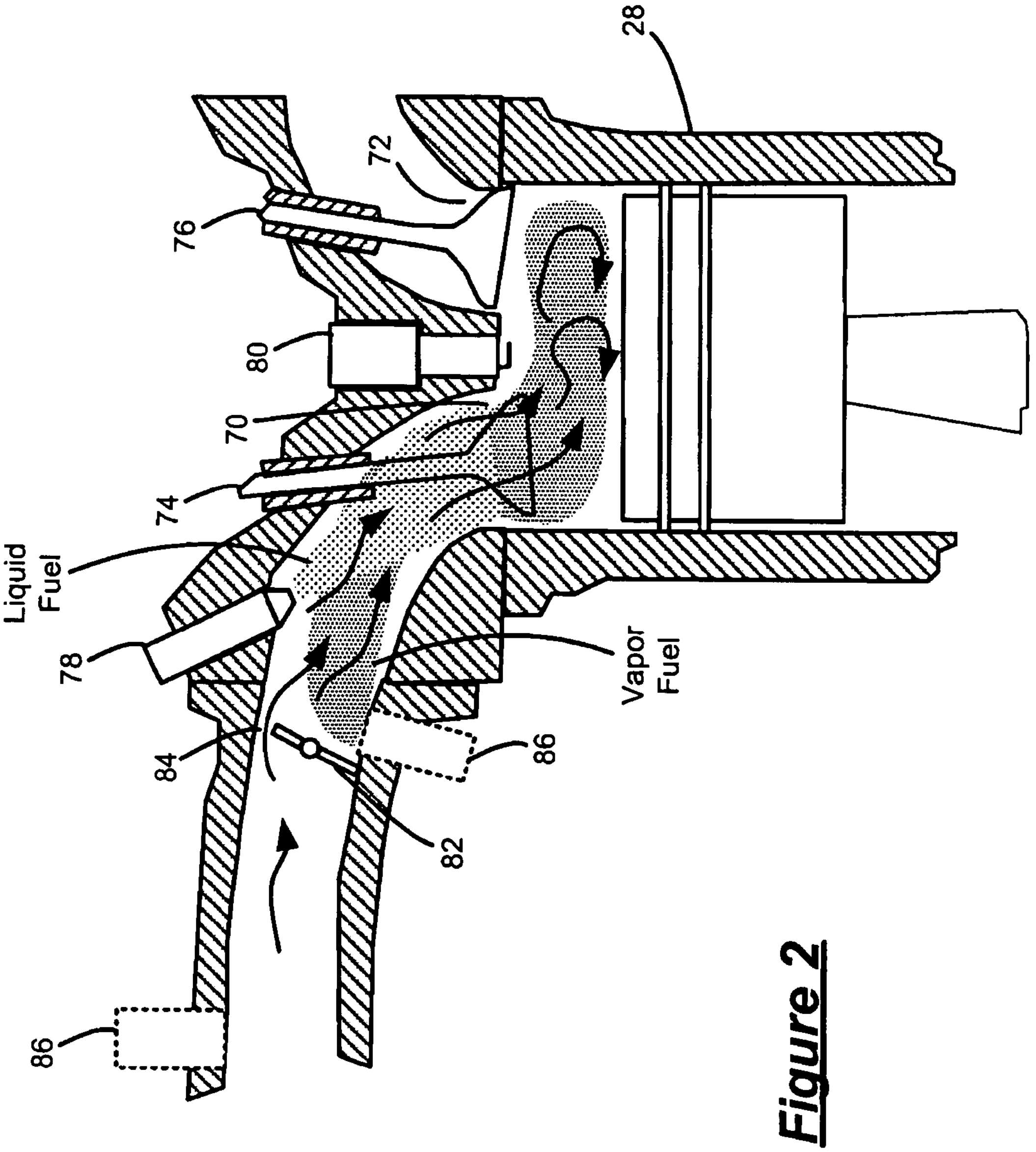
FIG. 2 is a cross-sectional view of an engine cylinder incorporating an intake mixture motion (IMM) system and a fuel vapor enrichment system according to the present invention.

Referring now to FIG. 2, each cylinder 28 includes at least one associated inlet port 70 and one associated exhaust port 72. An inlet valve 74 selectively enables fluid communication through the inlet port 70 and into the cylinder 28. An exhaust valve 76 selectively enables fluid communication through the exhaust port 72 and into the exhaust system 26. A liquid fuel injector 78 is disposed upstream of the inlet port 70. A spark plug 80 initiates combustion of the A/F mixture within the cylinder 28.

A plate 82 of the IMM system 24 is disposed upstream of the inlet port 70 and is regulated by the actuator 30. More particularly, the plate 82 is regulated between an open position and a closed position. In the open position, the plate 82 does not effect air flow into the cylinder 28 as it is generally parallel to the air flow. In the closed position (as illustrated in FIG. 2), the plate 82 is generally perpendicular to the air flow into the cylinder 28 to regulate air flow into the cylinder 28. More particularly, the plate 82 reduces the available air flow area forcing air flow through a cut-out section 84 of the plate 82. The cut-out section 84 produces a nozzling effect to provide accelerated, directional air flow into the cylinder 28. The cut-out section 84 is preferably designed to direct air flow without adding significant flow restriction or pressure drop at lower engine speeds. As a result, the plate 82 remains in the closed position during moderate accelerations.

The fuel injection system 20 further includes a vapor port 86 associated with each cylinder 28. The vapor port 86 is disposed along the air flow path into the cylinder 28. More particularly, the vapor port 86 can be positioned upstream of the plate 82 or downstream of the plate 82. The vapor port 86 injects fuel vapor from the fuel tank according to the cold start vapor fuel enrichment control described in further detail below. It is also anticipated, however, that the fuel injection system 20 can include a single vapor port 86. In the case of a single vapor port 86, fuel vapor is injected into the intake manifold 22. The fuel vapor is mixed with the air inside the intake manifold 22 and the A/F mixture is distributed to the individual cylinders 28.

As illustrated in FIG. 2 and as discussed in further detail below, both liquid and vapor fuel flow into the cylinder 28 according to the cold start vapor fuel enrichment control. The air flow is effected by the IMM system 24, which mixes the liquid and vapor fuel and generates a tumble-like flow within the cylinder 28. More particularly, the cut-out section 84 of the plate 82 directs and accelerates the air flow past the fuel injector 80 and down into the cylinder 28 causing the A/F flow to tumble in the cylinder 28.

Figure 3:
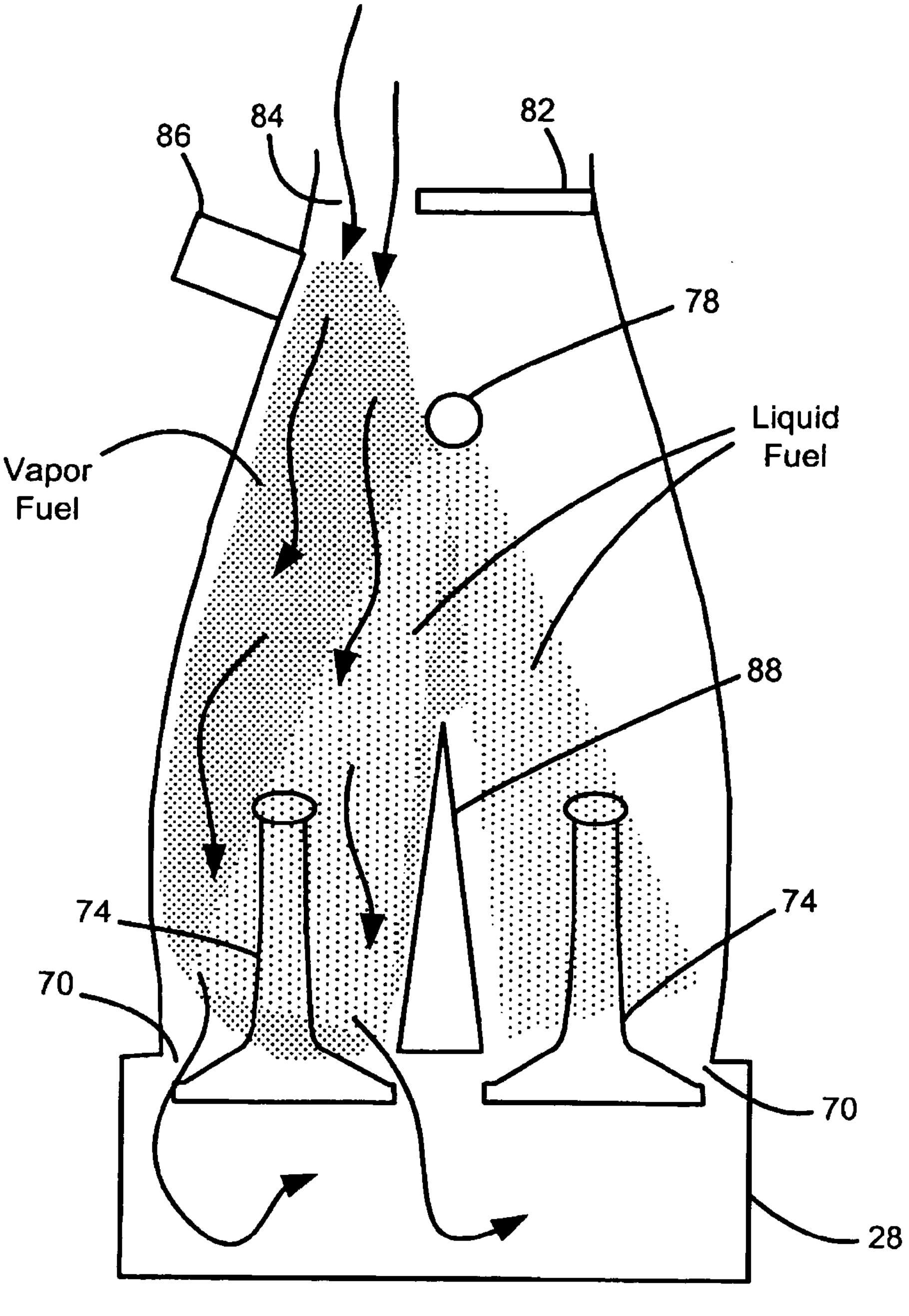
FIG. 3 is a schematic illustration of an engine cylinder incorporating the IMM system and the fuel vapor enrichment system to achieve a swirl flow through the cylinder.

Referring now to FIG. 3, the plate 82 can be configured to provide an alternative A/F flow within the cylinder 28. More particularly, FIG. 3 is a schematic illustration of the cylinder 28 including multiple inlet ports 70. The inlet ports 70 are separated by a septum 88. The liquid fuel injector 78 injects a reduced liquid fuel pulse-width toward both inlet ports 70. The required fuel vapor is provided by the fuel vapor port 86. The cut-out section 84 of the plate 82 is disposed to one side to accelerate air flow toward one inlet port 70. The accelerated air flow mixes the liquid and vapor fuel and induces the A/F mixture flow through one inlet port 70. The A/F mixture swirls across the cylinder 28 from one inlet port 70 to the other to ensure a properly rich A/F mixture at the spark region. Although the vapor port 86 is illustrated downstream of the plate 82, it is appreciated that the vapor port 86 can be disposed upstream of the plate 82, as discussed in detail above.

Figure 4:
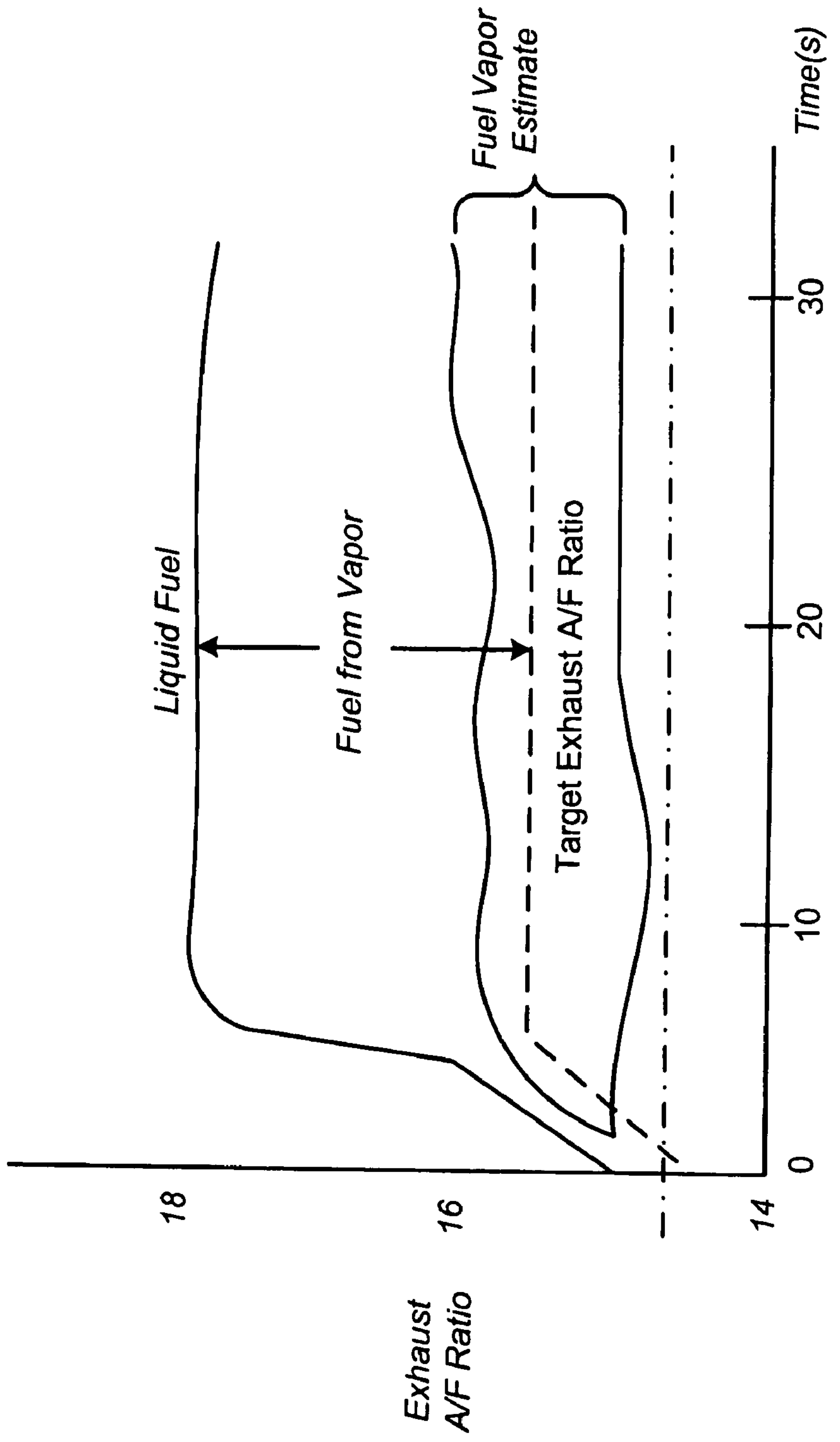
FIG. 4 is a graph illustrating a liquid fuel A/F ratio and a vapor fuel A/F ratio according to the present invention.

Referring now to FIG. 4, vapor fuel is used to supplement and enrich the A/F mixture during cold start of the engine 18. The vapor fuel within the fuel tank 42 retains a predictable A/F ratio between engine cold starts. The A/F ratio of the vapor fuel can be estimated based on temperature and a Reid vapor pressure (RVP) rating of the fuel. In an exemplary manner, the RVP value of the fuel is estimated during closed loop, steady-state engine operation based on a hydrocarbon purge flow and the temperature of the fuel tank 42.

The vapor fuel is typically very rich. Therefore, a relatively small amount of vapor fuel is able to provide a significant portion of the fuel required to compensate the engine 18. Vapor fuel is present within the fuel tank 42 at atmospheric pressure. A sufficient amount of vapor fuel is usually available to handle throttle crowds and step-in maneuvers. As shown graphically in FIG. 4, fuel vapor having an A/F ratio within the designated range of approximately 2 to approximately 3, can be supplied in conjunction with liquid fuel having an A/F ratio of up to 18 or 20, to achieve a target exhaust A/F ratio of about 15.5.

Figure 5:
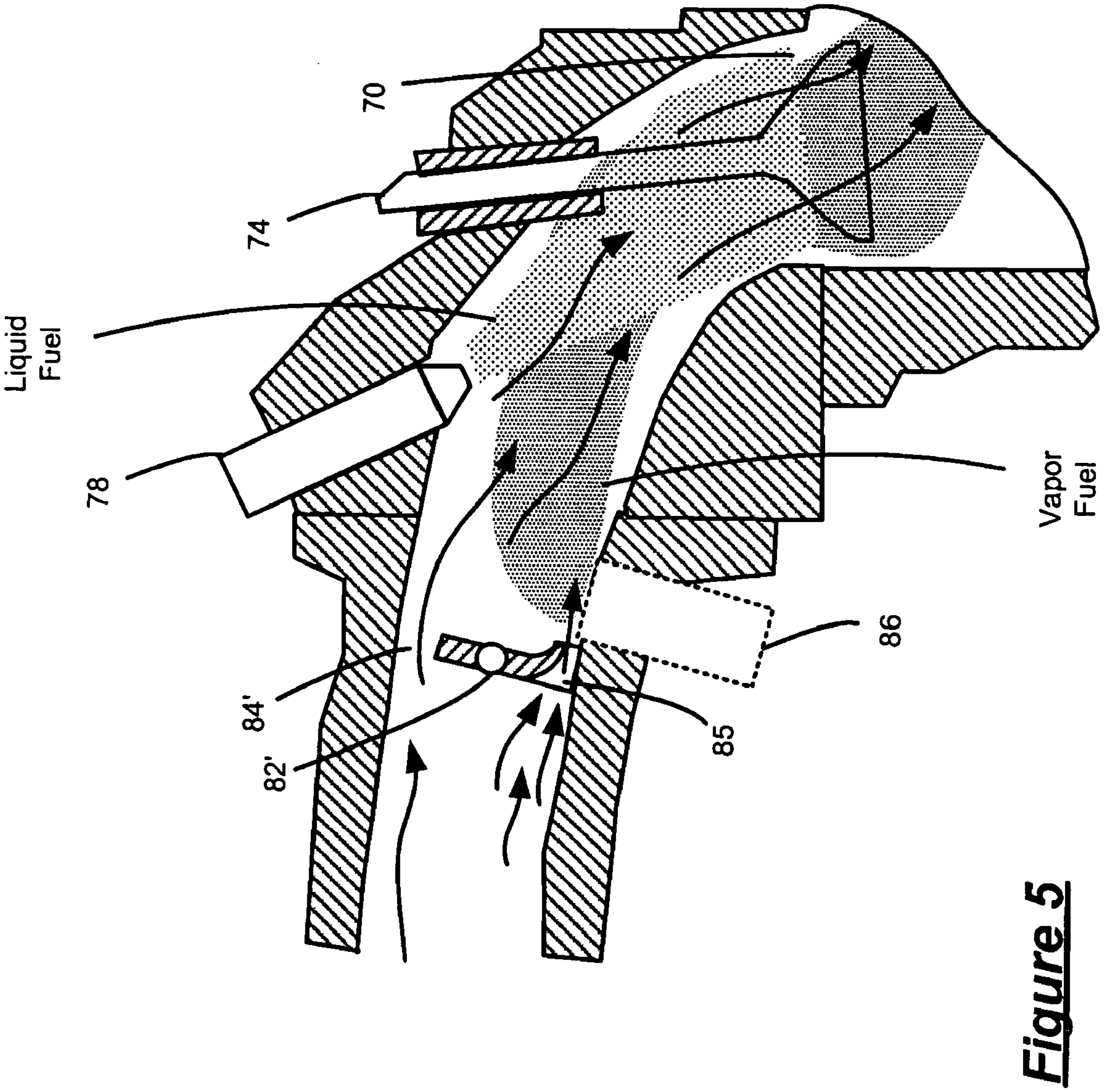
FIG. 5 is a more detailed cross-sectional view of the engine cylinder of FIG. 2 illustrating an alternative plate of the IMM system.

Referring now to FIG. 5, the vapor fuel mass flow rate is based on the pressure differential between the intake manifold 18 and the tank 42. The tank pressure is generally near atmospheric pressure. The manifold absolute pressure (MAP) varies based on throttling of the engine. More specifically, MAP is generally less than atmospheric pressure. As the throttle is opened during moderate acceleration, MAP approaches atmospheric pressure. As MAP approaches atmospheric pressure, the vapor fuel mass flow is reduced. During cold engine operation, maintaining the vapor fuel mass flow rate during short, moderate accelerations reduces the amount of liquid fuel enrichment required to maintain good driveability.

In order to maintain the vapor fuel mass flow rate during short, moderate accelerations, an alternative plate 82' includes a cut-out section 84' and a shaped orifice 85. The shaped orifice 85 is formed through the plate 82' such that when the plate 82' is in the closed position, the shaped orifice 85 is located immediately upstream of the vapor port 86. The shaped orifice 85 can be further enhanced by being shaped like a nozzle to increase the air flow velocity and the pressure drop through the shaped orifice 85. Air flow through the orifice is accelerated across the vapor port 86 creating a velocity air jet or siphon effect. A localized pressure drop occurs at the vapor port 86. The localized pressure drop maintains an additional vacuum as MAP increases to draw vapor fuel into the cylinder 28. In this manner, a vacuum delay effect occurs, which maintains vapor fuel mass flow during short acceleration maneuvers.

Figure 6:
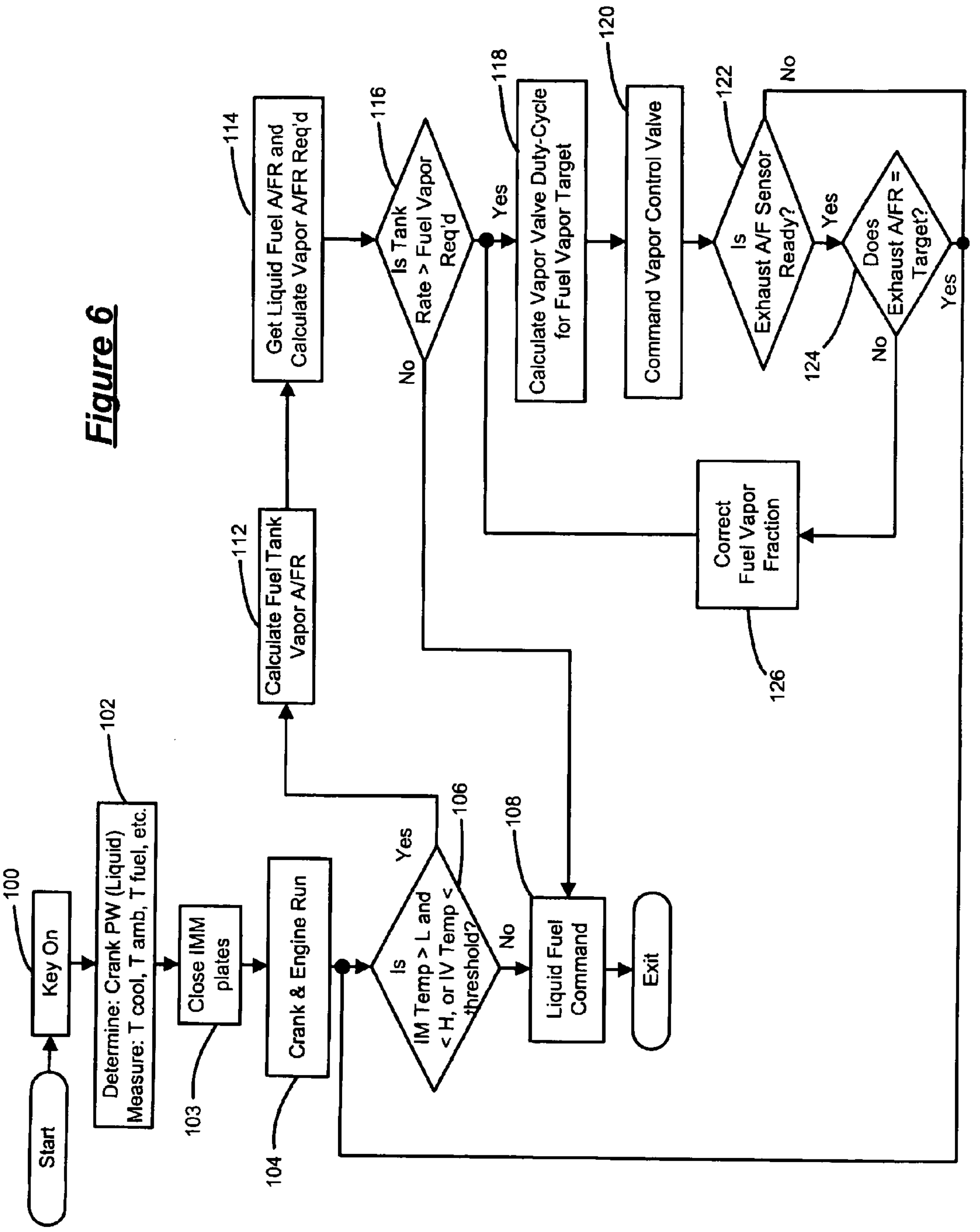
FIG. 6 is a flowchart showing steps of a cold start fuel vapor enrichment control method according to the present invention.

Referring now to FIG. 6, the cold start fuel vapor enrichment control method will be described in further detail. After a key-on event occurs in step 100, control determines the amount of liquid fuel required during engine crank (i.e. initial ignition). Currently available parameters including engine coolant temperature ($T_{COOL}$), ambient air temperature ($T_{AMB}$), and fuel temperature ($T_{FUEL}$) are measured in step 102. It is appreciated, however, that additional or alternative parameters can be implemented such as, but not limited to time from the previous engine shut-down. In step 103, the plates 82 are moved to the closed position. It is appreciated that while the plates 82 may be in the closed position for some liquid fuel only engine operation, the plates 82 are always in the closed position during fuel vapor enrichment engine operation, as described in further detail below.

In step 104, the engine is cranked and initially runs and burns the liquid fuel having an initial A/F ratio. In step 106, the intake manifold temperature ($T_{IM}$) is measured and compared to a predetermined temperature range. If $T_{IM}$ falls outside of the temperature range, control operates the engine using only liquid fuel in step 108. If $T_{IM}$ falls within the temperature range, control initiates a vapor enrichment mode. In one embodiment, the predetermined temperature range is between approximately 30° F. and 85° F., although other temperature values may be used.

Alternatively, in step 106, intake valve temperature is estimated and compared to a threshold value. The intake valve temperature is estimated based on engine coolant temperature, engine speed, manifold absolute pressure (MAP), and an equivalence ratio. The equivalence ratio is defined as the stoichiometric A/F ratio divided by the actual A/F ratio. A predictive model for intake valve temperature is provided in "Intake-Valve Temperature and the Factors Affecting It", Alkidas, A. C., SAE Paper 971729, 1997, expressly incorporated herein by reference. If the intake valve temperature is greater than the threshold value, control operates the engine 18 using only liquid fuel in step 108. If the intake valve temperature is less than the threshold value, control initiates the vapor enrichment mode. The threshold temperature is provided as 120° C., however, it is appreciated that the specific value of the threshold temperature may vary.

In the vapor enrichment mode, the plates 82 of the IMM system 24 are always in the closed position. The A/F ratio of the vapor fuel within the fuel tank 42 is estimated in step 112. In step 114, the present liquid fuel A/F ratio is determined and the target vapor fuel A/F ratio is calculated. The vapor fuel A/F ratio is compared to the target vapor fuel A/F ratio in step 116. If the vapor fuel A/F ratio is insufficient (i.e. numerically greater than the target vapor fuel A/F ratio), control continues with step 108. If the vapor A/F ratio is sufficient (i.e. numerically less than the target vapor fuel A/F ratio), control continues with step 118. In step 118, a duty-cycle for the purge solenoid valve 60 is calculated to achieve the appropriate flow of vapor fuel into the engine 18. In step 120, control operates the purge solenoid valve 60 at the calculated duty-cycle.

In step 122, control determines whether the first $O_2$ sensor is ready to provide an exhaust A/F ratio measurement. If the first $O_2$ sensor is not ready, control loops back to step 106. If the first $O_2$ sensor is ready, control continues in step 124 by comparing an exhaust A/F ratio to the target exhaust A/F ratio. If the exhaust A/F ratio is equal to the target exhaust A/F ratio, control loops back to step 106. However, if the exhaust A/F ratio is not equal to the target exhaust A/F ratio, control continues in step 126. In step 126, the vapor fuel supply is adjusted using the purge solenoid valve duty cycle in step 118.

Control continuously loops through the vapor enrichment mode until $T_{IM}$ achieves a temperature outside of the specified range. An end of the start-up period occurs when $T_{IM}$ is a sufficiently high temperature and control loops to step 108 to initiate normal operation of the engine.

Figure 7:
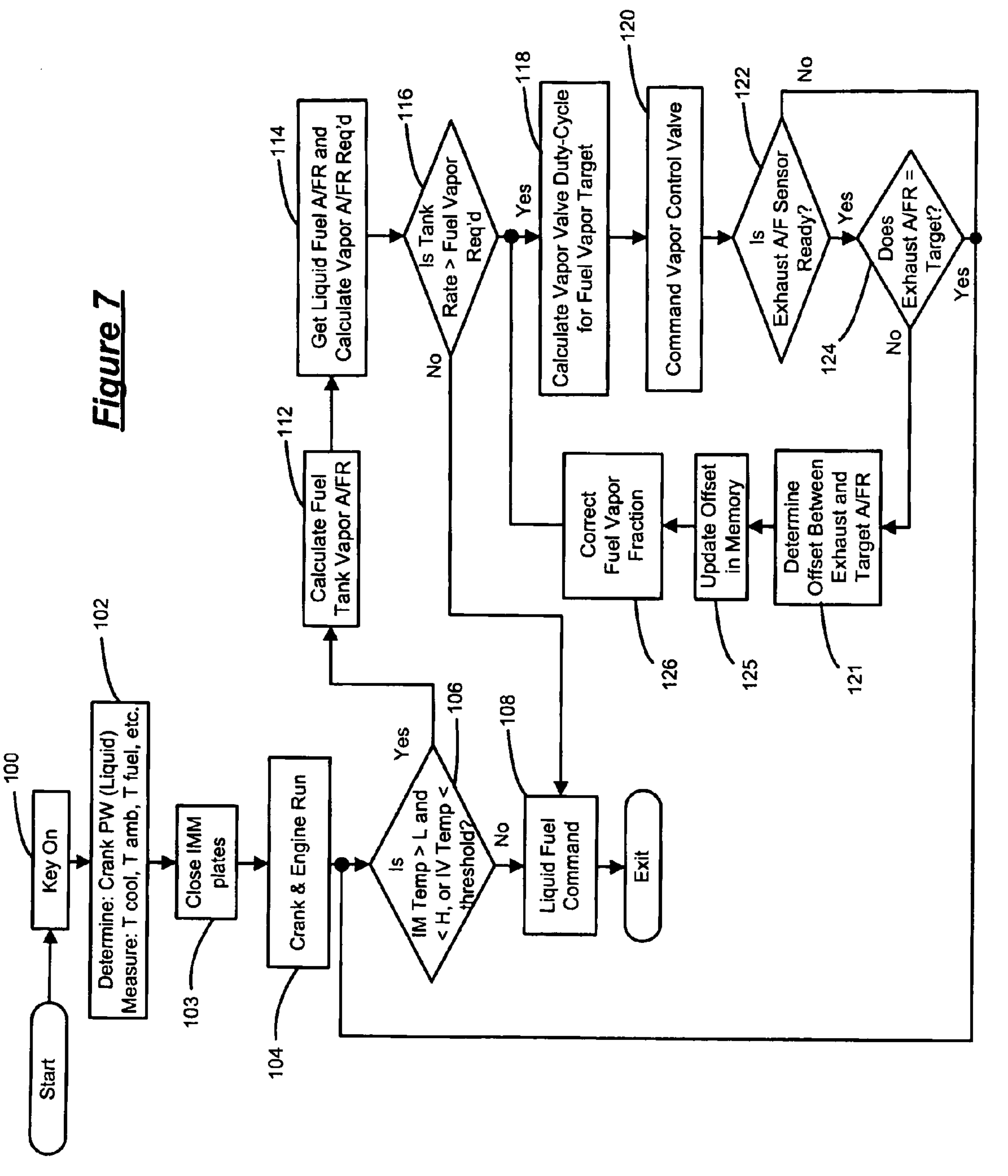
FIG. 7 is a flowchart showing steps of the cold start fuel vapor enrichment control method including determining an A/F ratio offset.

With reference to FIG. 7, the fuel tank vapor A/F ratio calculated in step 112 can be trimmed or corrected. In step 121, an offset is calculated as the difference between the exhaust A/F ratio and the target exhaust A/F ratio. The offset is updated in memory in step 125 as control loops through the vapor enrichment mode. Upon the next cold-start of the vehicle, calculation of the fuel tank vapor A/F ratio in step 112 takes into account the offset value stored in memory. This enables more accurate control of the A/F ratios. The offset value can be compared with the RVP estimate to further improve the vapor A/F ratio estimate.

The cold start fuel vapor enrichment control method of the present invention significantly reduces the liquid fuel required during cold start and warm up. Further, HC emissions are reduced and the engine is able to operate slightly lean of the stoichiometric A/F ratio to enable quick catalyst warm-up. Additionally, the control strategy of the present invention can be readily implemented in a traditional engine system with minimal hardware modification.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine system, comprising:

an engine having an intake manifold and a cylinder;

an intake mixture motion system that includes a plate disposed upstream of said cylinder and an actuator that moves said plate between an open position and a closed position to direct cylinder air flow, wherein said plate is in said closed position for a predetermined period after engine start-up; and a fuel system that communicates with said engine and that supplies a first quantity of liquid fuel to said engine at a first A/F ratio and that supplies a second quantity of vapor fuel to said engine at a second A/F ratio to provide a fuel mixture having a third A/F ratio during said predetermined period.

2. The engine system of claim 1 wherein said plate obstructs a portion of an intake passage into said cylinder when in said closed position.

3. The engine system of claim 1 further comprising a vapor port through which said second quantity of vapor fuel in supplied.

4. The engine system of claim 3 wherein said plate includes a shaped orifice that is disposed upstream of said vapor port when said plate is in said closed position and that accelerates a portion of said cylinder air flow across said vapor port.

5. The engine system of claim 1 wherein said fuel system adjusts said first and second quantities based on a temperature of said engine.

6. The engine system of claim 5 wherein said second quantity is zero if said engine temperature is outside of a specified temperature range.

7. The engine system of claim 5 wherein said engine temperature is an intake manifold temperature.

8. The engine system of claim 5 wherein said engine temperature is an intake valve temperature.

9. The engine system of claim 1 wherein an initial A/F ratio of liquid fuel is supplied to said engine during start-up and said third A/F ratio is estimated based thereon.

10. The engine system of claim 1 wherein an available A/F ratio of vapor fuel within said fuel tank is determined and is compared with a target A/F ratio range, wherein said second quantity is set to zero if said A/F ratio of said vapor fuel is outside of said target A/F ratio range.

11. The engine system of claim 10 wherein said available A/F ratio is adjusted based on an A/F ratio offset.

12. The engine system of claim 1 further comprising an exhaust A/F ratio sensor that monitors an exhaust A/F ratio, wherein said exhaust A/F ratio is compared to a target A/F ratio range, and said first and second quantities are adjusted if said exhaust A/F ratio is outside of said target A/F ratio range.

13. The engine system of claim 12 wherein an A/F ratio offset is calculated based on said exhaust A/F ratio and said target A/F ratio.

14. An engine system comprising:

an engine having an intake manifold, a cylinder and a plate that is disposed upstream of said cylinder and that is movable between an open position and a closed position to redirect air flow into said cylinder, said plate being in said closed position for a predetermined period after engine start-up; and a fuel system that communicates with said engine and that supplies a first quantity of liquid fuel to said engine at a first A/F ratio and that supplies a second quantity of vapor fuel to said engine at a second A/F ratio to provide a fuel mixture having a third A/F ratio during said predetermined period.

15. The engine system of claim 14 wherein said fuel system adjusts said first and second quantities based on a temperature of said engine.

16. The engine system of claim 15 wherein said second quantity is zero if said engine temperature is outside of a specified temperature range.

17. The engine system of claim 15 wherein said engine temperature is an intake manifold temperature.

18. The engine system of claim 15 wherein said engine temperature is an intake valve temperature.

19. The engine system of claim 14 wherein an initial A/F ratio of liquid fuel is supplied to said engine during start-up and said third A/F ratio is estimated based thereon.

20. The engine system of claim 14 wherein an available A/F ratio of vapor fuel within said fuel tank is determined and is compared with a target A/F ratio range, wherein said second quantity is set to zero if said A/F ratio of said vapor fuel is outside of said target A/F ratio range.

21. The engine system of claim 20 wherein said available A/F ratio is adjusted based on an A/F ratio offset.

22. The engine system of claim 14 further comprising an exhaust A/F ratio sensor that monitors an exhaust A/F ratio, wherein said exhaust A/F ratio is compared to a target A/F ratio range, and said first and second quantities are adjusted if said exhaust A/F ratio is outside of said target A/F ratio range.

23. The engine system of claim 22 wherein an A/F ratio offset is calculated based on said exhaust A/F ratio and said target A/F ratio.

24. A method of operating an internal combustion engine comprising:

supplying liquid fuel having a first A/F ratio to a cylinder of said engine during start-up;

supplying liquid fuel at a second A/F ratio and vapor fuel at a third A/F ratio to said cylinder for a predetermined period after start-up;

moving a plate to a closed position to direct cylinder air flow during said predetermined period after start-up; and determining said predetermined period based on a temperature of said engine.

25. The method of claim 24 further comprising:

increasing a throttle of said internal combustion engine; and accelerating a portion of said cylinder air flow across a vapor port to maintain supply of said vapor fuel to said cylinder.

26. The method of claim 24 wherein said temperature is an intake manifold temperature.

27. The method of claim 24 wherein said temperature is an intake valve temperature.

28. The method of claim 24 further comprising calculating said third A/F ratio based on said first A/F ratio.

29. The method of claim 24 further comprising:
determining an available A/F ratio of vapor fuel within a fuel tank; and
comparing said available A/F ratio with a target A/F ratio range, wherein said third mass is zero if said available A/F ratio is outside of said target A/F ratio range.

30. The method of claim 29 further comprising adjusting said available A/F ratio based on an A/F ratio offset.

31. The method of claim 24 further comprising controlling a valve in communication with a supply of vapor fuel to regulate said vapor fuel.

32. The method of claim 24 further comprising:
comparing an exhaust A/F ratio to a target A/F ratio; and
adjusting flow of said liquid fuel and said vapor fuel if said exhaust A/F ratio is not equal to said target A/F ratio.

33. The method of claim 32 further comprising:
determining an A/F ratio offset based on said exhaust A/F ratio and said target A/F ratio;
storing said A/F ratio offset; and
adjusting said third A/F ratio based on said A/F ratio offset.

34. A method of operating a combustion engine comprising:
determining whether a temperature of said engine is within a specified range;
determining a first A/F ratio of a first supply of liquid fuel;
determining a second A/F ratio of a second supply of vapor fuel based on said first A/F ratio;
supplying said first supply of liquid fuel and said second supply of vapor fuel to a cylinder said engine during a predetermined period after start-up; and
moving a plate to a closed position to direct cylinder air flow during said predetermined period.

35. The method of claim 34 further comprising:
increasing a throttle of said internal combustion engine; and accelerating a portion of said cylinder air flow across a vapor port to maintain supply of said vapor fuel to said cylinder.

36. The method of claim 34 wherein said temperature is an intake manifold temperature.

37. The method of claim 34 wherein said temperature is an intake valve temperature.

38. The method of claim 34 further comprising:
determining a third A/F ratio of a third supply of liquid fuel supplied to said engine during starting; and
calculating said second A/F ratio based on said third A/F ratio.

39. The method of claim 34 further comprising:
determining an available A/F ratio of vapor fuel within a fuel tank; and
comparing said available A/F ratio with a target A/F ratio range, wherein said second supply is zero if said available A/F ratio is outside of said target A/F ratio range.

40. The method of claim 39 further comprising adjusting said available A/F ratio based on an A/F ratio offset.

41. The method of claim 34 further comprising controlling a valve in communication with a supply of vapor fuel to regulate said second supply of vapor fuel.

42. The method of claim 34 further comprising:
comparing an exhaust A/F ratio to a target A/F ratio; and
adjusting said first supply and second supply if said exhaust A/F ratio is not equal to said target A/F ratio.

43. The method of claim 42 further comprising:
determining an A/F ratio offset based on said exhaust A/F ratio and said target A/F ratio;
storing said A/F ratio offset; and
adjusting said third A/F ratio based on said A/F ratio offset.

* * * * *